US008364887B2

(12) United States Patent
Wong et al.

(10) Patent No.: US 8,364,887 B2
(45) Date of Patent: Jan. 29, 2013

(54) MANAGING MEMORY DATA RECOVERY UPON POWER LOSS (75) Inventors: Wanmo Wong, Menlo Park, CA (US); Karunakaran Muthusamy, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 263 days.

(21) Appl. No.: 12/694,959

(22) Filed: Jan. 27, 2010

(65) Prior Publication Data

US 2010/0131702 A1 May 27, 2010

Related U.S. Application Data

(60) Continuation of application No. 11/652,241, filed on Jan. 10, 2007, now Pat. No. 7,676,627, which is a continuation of application No. 10/975,577, filed on Oct. 28, 2004, now Pat. No. 7,185,154, which is a division of application No. 10/232,840, filed on Aug. 29, 2002, now Pat. No. 6,968,439.

(51) Int. Cl.
*G06F 12/16* (2006.01)
*G06F 11/00* (2006.01)

(52) U.S. Cl. ......... 711/103; 711/162; 714/6.2; 714/21; 714/22

(58) Field of Classification Search .................. None
See application file for complete search history.

(56) References Cited

U.S. PATENT DOCUMENTS

| 4,215,402 A | 7/1980 | Mitchell et al. ............. 364/200 |
| 4,580,211 A | 4/1986 | Doki et al. .................. 364/200 |
| 5,394,531 A | 2/1995 | Smith .......................... 395/425 |
| 5,404,485 A | 4/1995 | Ban ............................ 395/425 |
| 5,778,442 A | 7/1998 | Ezzat et al. ................... 711/159 |
| 5,898,868 A | 4/1999 | Krueger et al. .............. 395/621 |
| 5,933,855 A | 8/1999 | Rubinstein .................... 711/200 |
| 6,105,115 A | 8/2000 | Mathews et al. ............. 711/160 |
| 6,125,424 A | 9/2000 | Komatsu et al. ............. 711/103 |
| 6,141,251 A | 10/2000 | Xing ........................ 365/185.11 |
| 6,141,731 A | 10/2000 | Beardsley et al. ........... 711/136 |
| 6,202,122 B1 | 3/2001 | Yamada ....................... 711/103 |
| 6,226,728 B1 | 5/2001 | See et al. ..................... 711/171 |
| 6,327,644 B1 | 12/2001 | Beardsley et al. ........... 711/136 |
| 6,378,043 B1 | 4/2002 | Girkar et al. ................ 711/133 |
| 6,401,160 B1 | 6/2002 | See et al. ........................ 711/5 |
| 6,427,186 B1 | 7/2002 | Lin et al. ..................... 711/103 |
| 6,621,746 B1 | 9/2003 | Aasheim et al. ......... 365/185.29 |
| 6,651,116 B1 | 11/2003 | Ludwig et al. ................. 710/33 |
| 6,725,321 B1 | 4/2004 | Sinclair ....................... 711/103 |
| 6,732,222 B1 | 5/2004 | Garritsen et al. ............. 711/103 |

(Continued)

OTHER PUBLICATIONS

Bach, Maurice J., "The Design of the Unix® Operating System", Bell Telephone Laboratories, Inc., Prentice-Hall, Inc., Englewood Cliffs, New Jersey, 1986, pp. xi-xiv and 271-311.

(Continued)

*Primary Examiner* — Than Nguyen
(74) *Attorney, Agent, or Firm* — Dorsey & Whitney LLP (57) ABSTRACT

A single segment data structure and method for storing data objects employing a single segment data object having a header and a data record. The header includes a segment length field describing the length of memory reserved for the data record and the data record contains at least one data instance object. Each of the data instance objects has a data instance header and data field. The header includes a data instance state field and a data instance length field. The data instance length field contains data representing the length of the data instance data field allowing for variable length "in place" updating. The data instance state field contains data representing an object state of the instance data. Only one of the data instance objects of the data record of the single segment data object has a valid object state. The state field facilitates a power loss recovery process.

22 Claims, 7 Drawing Sheets

U.S. PATENT DOCUMENTS

| | | |
|---|---|---|
| 6,735,678 B2 | 5/2004 | Noble et al. ............... 711/165 |
| 6,839,823 B1 * | 1/2005 | See et al. ............... 711/171 |
| 6,895,486 B2 | 5/2005 | Wong et al. ............... 711/173 |
| 6,928,456 B2 * | 8/2005 | Sadhasivan et al. ............... 1/1 |
| 6,928,531 B2 | 8/2005 | Wong ............... 711/218 |
| 6,938,140 B2 | 8/2005 | Louie et al. ............... 711/165 |
| 6,968,439 B2 | 11/2005 | Wong et al. ............... 711/170 |
| 6,970,969 B2 | 11/2005 | Wong et al. ............... 711/103 |
| 7,085,908 B2 | 8/2006 | Wong et al. ............... 711/173 |
| 7,130,979 B2 | 10/2006 | Wong ............... 711/165 |
| 7,139,896 B2 | 11/2006 | Wong ............... 711/218 |
| 7,162,606 B2 | 1/2007 | Wong et al. ............... 711/170 |
| 7,185,154 B2 | 2/2007 | Wong et al. ............... 711/156 |
| 7,272,696 B2 | 9/2007 | Wong ............... 711/173 |
| 7,493,442 B2 | 2/2009 | Wong et al. ............... 711/103 |
| 7,529,882 B2 | 5/2009 | Wong ............... 711/103 |
| 2003/0163660 A1 | 8/2003 | Lam ............... 711/170 |
| 2006/0200621 A1 | 9/2006 | Wong ............... 711/103 |
| 2007/0113028 A1 | 5/2007 | Wong ............... 711/156 |

OTHER PUBLICATIONS

Intel®, "Intel® Flash Data Integrator (FDI) User's Guide", Version 4, Aug. 2001, pp. ii-314.

Jones, Richard, et al., "Garbage Collection Algorithms for Automatic Dynamic Memory Management", John Wiley & Sons Ltd., Chichester, England, 1996, pp. vii-xxvi and 1-41.

Silberschatz, Abraham et al., "Operating System Concepts, Fifth Edition", Addison Wesley Longman, Inc., 1998, pp. v-xvii and 239-336.

Tanenbaum, Andrew S., "Operating Systems: Design and Implementation", Prentice Hall, Inc., Englewood Cliffs, New Jersey, 1987, pp. vii-xvi and 191-250.

* cited by examiner

| NUMBER | SINGLE SEGMENT OBJECT HEADER STATE | BINARY VALUE | POWER LOSS RECOVERY ACTION | NEXT STATE | ACTION FOR NEXT STATE |
|---|---|---|---|---|---|
| 001 | EMPTY | 1111 1111 | NONE | WRITING_HDR_LEN | WRITE STATE AND LENGTH |
| 002 | WRITING_HDR_LEN | 1111 1110 | SKIP HEADER STATE AND LENGTH FIELDS | WRITING_HDR | WRITE STATE AND HEADER RECORD |
| 003 | WRITING_HDR | 1111 1100 | SKIP HEADER | WRITTEN_HDR | WRITE STATE |
| 004 | WRITTEN_HDR | 1111 1000 | SKIP HEADER AND DATA | WRITING_DATA | WRITE INSTANCE STATE AND DATA, SEE FIGURE 6 |
| 005 | WRITING_DATA | 1111 0000 | SKIP HEADER AND DATA | WRITTEN_DATA | WRITE STATE WHEN FINISH WRITING DATA, SEE NOTE |
| 006 | WRITTEN_DATA | 1110 0000 | CHANGE STATE TO VALID_DATA | VALID_DATA | WRITE STATE |
| 007 | VALID_DATA | 1100 0000 | NONE | INVALID_DATA | WRITE STATE |
| 008 | INVALID_DATA | 1000 0000 | SKIP HEADER AND DATA | EMPTY | ERASE FLASH BLOCK |

NOTE: THE WRITTEN_DATA AND VALID_DATA STATES WORK TOGETHER FOR INVALIDATING THE ORIGINAL DATA IN THE COPYING PROCESS.

Fig. 5

| NUMBER | DATA INSTANCE STATE | BINARY VALUE | POWER LOSS RECOVERY ACTION | NEXT STATE | ACTION FOR NEXT STATE |
|---|---|---|---|---|---|
| 001 | EMPTY | 1111 1111 | NONE | WRITING_HDR_LEN | WRITE STATE AND LENGTH |
| 002 | WRITING_HDR_LEN | 1111 1110 | SKIP HEADER STATE AND LENGTH FIELDS | WRITING_HDR | WRITE STATE AND HEADER RECORD |
| 003 | WRITING_HDR | 1111 1100 | SKIP HEADER | WRITTEN_HDR | WRITE STATE |
| 004 | WRITTEN_HDR | 1111 1000 | SKIP HEADER | WRITING_DATA | WRITE STATE AND DATA |
| 005 | WRITING_DATA | 1111 0000 | SKIP HEADER AND DATA | WRITTEN_DATA | WRITE STATE WHEN FINISH WRITING DATA |
| 006 | WRITTEN_DATA | 1110 0000 | CHANGE STATE TO VALID_DATA | VALID_DATA | CHANGE LAST INSTANCE STATE TO INVALID_DATA IF IT EXISTS, CHANGE CURRENT STATE TO VALID_DATA |
| 007 | VALID_DATA | 1100 0000 | NONE | INVALID_DATA | WRITE STATE |
| 008 | INVALID_DATA | 1000 0000 | SKIP HEADER AND DATA | EMPTY | ERASE FLASH BLOCK |

MANAGING MEMORY DATA RECOVERY UPON POWER LOSS

CROSS-REFERENCE TO RELATED APPLICATION

This application is a continuation of pending U.S. patent application Ser. No. 11/652,241 filed Jan. 10, 2007, which is a continuation of U.S. patent application Ser. No. 10/975,577 filed Oct. 28, 2004 and issued as U.S. Pat. No. 7,185,154 B2, which is a divisional of U.S. patent application Ser. No. 10/232,840 filed Aug. 29, 2002 and issued as U.S. Pat. No. 6,968,439 B2. These applications and patents are each incorporated by reference herein.

TECHNICAL FIELD

The present invention is related generally to the field of semiconductor memory devices, and more particularly, to data management in semiconductor memory devices, such as flash memory devices.

BACKGROUND OF THE INVENTION

Non-volatile memory is a type of memory that can retain data and information even when power is not applied. An example of non-volatile memory that is being used in a variety of applications, such as cellular phone technology, is "flash memory." Flash memory is a form of electrically erasable programmable read-only memory (EEPROM), where data can be written in bytes and erased in blocks of memory. The blocks of memory typically range from 8 kBytes to 1 MByte in size. The cell density of flash memory devices can be very high, often as high as conventional dynamic random access memory (DRAM) cells, since in conventional flash memory a single floating gate structure is used for each memory cell. Flash memory devices also have relatively fast data access times. In the past, flash memory has been used in applications such as storing basic input/output system (BIOS) information in personal computers. However, with improvements in programming capabilities, and the continually increasing demand for persistent and low-power memory devices, the application of flash memory in many other areas has expanded very rapidly.

As previously mentioned, one such application is in cellular phones. At one time, cellular phones were only limited to voice communication. Now, cellular phones provide Internet access and web browsing capabilities, allow a user to capture and store computer graphic images, capture and playback video images, and provide personal digital assistant (PDA) capabilities. As a consequence, cellular phones need to be able to store different types of data and information. For example, whereas older cellular phones would only need to store data representing phone numbers, newer cellular phones need to store in addition to phone numbers, voice information, computer graphic images, small applications (e.g., Java applets) downloaded from the Internet, and the like.

The various data objects that must be stored by the flash memory have different characteristics. For example, data such as phone numbers are generally small segments of data having uniform length. Other data can be variable in length, such as voice information, where the amount of memory used depends on the length of voice information recorded. Data can be packetized, as in the case where data is downloaded from the Internet. Additionally, the amount of memory consumed by data such as voice information and image files can be considerable, spanning multiple blocks of flash memory. Application code, such as a Java applet, is unique in that the binary code must be stored contiguously in flash memory to allow for the code to be executed by a processor directly from the flash memory.

Flash memory, which is non-volatile, and has low operating power, is perfectly suited for data and information storage applications such as in cellular phones where conservation of power is very desirable. However, the operating characteristics of flash memory must be adapted to facilitate storage of the different types of data and information previously described.

Flash memory, although providing many of the characteristics required for applications in portable and remote (wireless) devices, has unique operational characteristics that need to be considered. For example, because of the floating gate structure of conventional flash memory cells, data cannot be simply overwritten. The memory cells must be erased prior to writing new data. Also, as previously mentioned, flash memory devices are designed to erase data in blocks of memory cells, rather than on a cell-by-cell basis. Thus, although only a portion of the memory cells of a block need to be updated, the entire block must first be erased before programming the new data. The process of erasing an entire block of memory cells and programming new data takes a relatively long time to complete, and deferring an erase operation is often desirable. Additionally, erasing the entire block is a problem, however, in the case where another portion of the memory cells of the block do not need to be updated. Another issue related to flash, and other floating gate memory devices, is that these memory cells have a limited life-cycle where repeated cycles of erasing and programming degrade memory cell performance. Eventually, the cell performance is degraded to such a degree that the memory cell can no longer be used to store data.

In an effort to facilitate the use of flash products in applications such as cellular phones, memory management software interfaces have been developed to make the management of data storage in flash devices transparent to the user. The memory management software carries out various operations in the flash memory such as managing code, data and files, reclaiming memory when insufficient erased memory is available for programming new data, and wear-leveling flash blocks to increase cycling endurance. Memory management typically includes functions to support storage of parameter data for EEPROM replacement, data streams for voice recordings and multimedia, Java applets and native code for direct execution, and packetized data downloads. In addition to these operations, the memory management software often ensures that in the event of a power loss, previously programmed data is not lost or corrupted. An example of this type of memory management software is Intel® Flash Data Integrator (FDI) software.

Although conventional flash memory management software has succeeded in increasing the flexibility of flash memory, there is still room for additional improvement. Conventional memory management software has limitations in the area of data management. For example, in some conventional flash memory management software, the memory space of a flash device is partitioned into fixed memory address ranges and either code or data is associated with each of the ranges. Once set at compile time, the range and the type of associated data cannot be changed without recompilation. Consequently, if at a later time a different partitioning between code and data is desired, the ranges defined for the two types of data cannot be modified unless software is recompiled. Additionally, although different flash memory management software performs many of the same functions, the process by which the functions are performed can be very different, with some being more efficient or faster than others. Therefore, there is a need for alternative memory management processes that can be implemented for flash memory devices.

SUMMARY OF THE INVENTION

The present invention is directed to a data structure having a single segment data object having a header record and a data record. The header record includes a segment length field containing data representing a length of memory reserved for the data record of the single segment data object, and the data record contains data representing at least one data instance object. A state and header length field may also be included in the header record to store an object state of the single segment data object and define the length of the header record. Each of the data instance objects has a data instance header and a data instance data field. The data instance header includes a data instance state field and a data instance length field. The data instance length field contains data representing length information of the data instance data field. The data instance data field contains data having an object state represented by data contained in the data instance state field. Use of the data instance length field allows for variable length "in place" updating of data in the data instance data field. An optional header length field and timestamp field may be included in the data instance header as well to describe the length of the instance data header and time information at which the instance data object is written, respectively. Only one of the data instance objects of the data record of the single segment data object has a valid object state. The state fields of the header record and the data instance header can be used to facilitate a power loss recovery process.

The present invention is further directed to a method for storing data objects. The method includes storing a single segment data object header in a block of memory, such as a flash memory device, including length information defining a length of memory reserved for a data record. Additionally, at least one data instance object is stored in the data record defined by the length information. For each data instance object of the data record, the method includes defining an object state of the data instance object, defining a length of a data instance field, and writing data into the data instance field. If data is to be updated, state data for a new data instance object as well as length data defining a length of a data instance data field of the new data instance object are written in the data record. Updated data is written into the data instance data field of the new data instance object to update the data of the previous data instance data field. The state data for the previous data instance object is modified to an invalid object state.

DETAILED DESCRIPTION OF THE INVENTION

Embodiments of the present invention are directed to a memory management operation and structure that provides flexibility in handling various types of data objects. In the following detailed description of exemplary embodiments of the invention, reference is made to the accompanying drawings, which form a part hereof, and in which are shown, by way of illustration, specific exemplary embodiments in which the invention may be practiced. These embodiments are described in sufficient detail to enable those skilled in the art to practice the invention. However, it will be clear to one skilled in the art that the invention may be practiced without these particular details. Other embodiments may be utilized and modifications may be made without departing from the spirit or scope of the present invention. The following detailed description is, therefore, not to be taken in a limiting sense, and the scope of the present invention is defined only by the appended claims.

Figure 1:
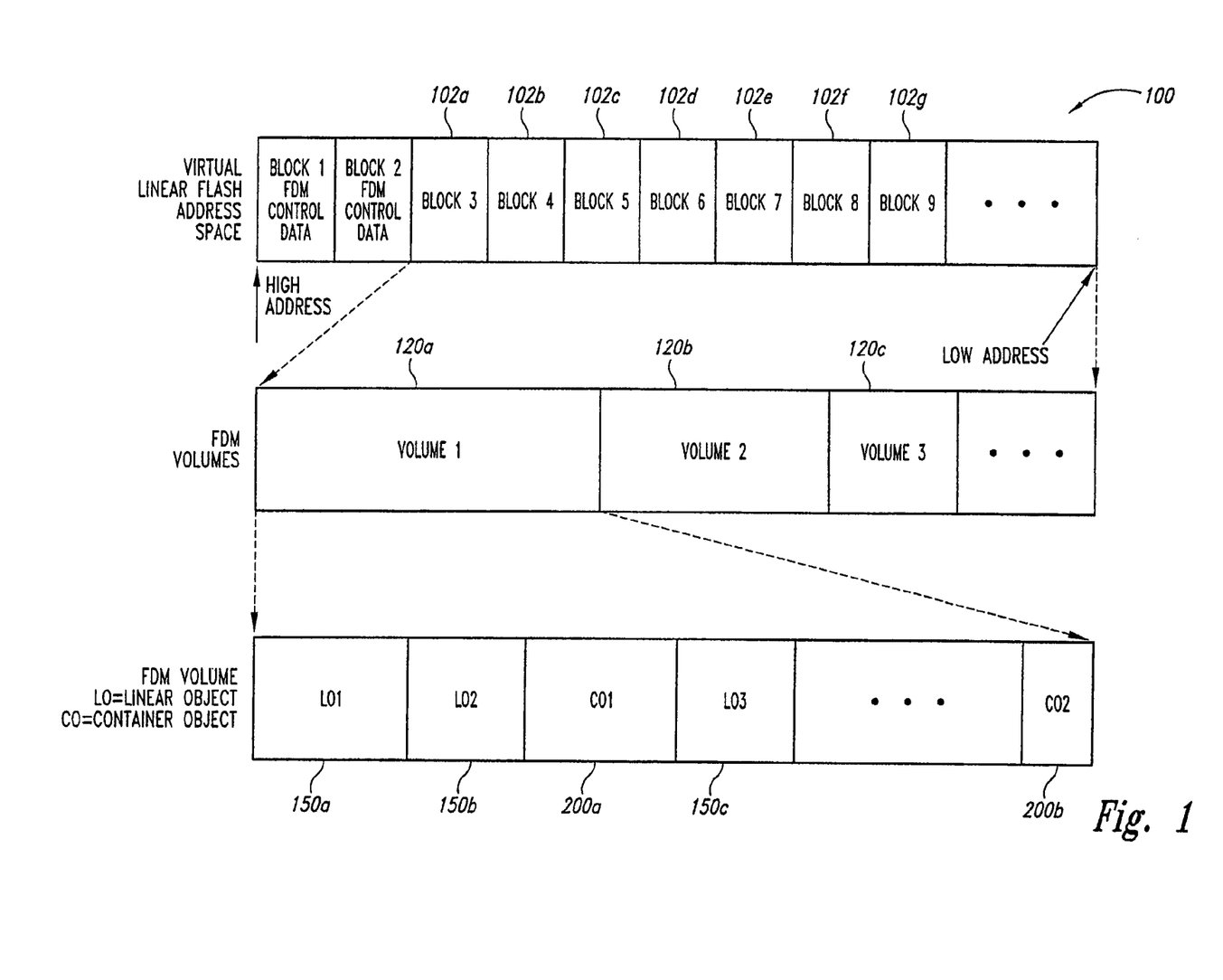
FIG. 1 is a drawing of a data architecture according to an embodiment of the present invention.

FIG. 1 shows a data architecture 100 according to an embodiment of the present invention. The data architecture 100 can be used in a flash data manager (FDM) process to handle data objects in a flash memory device. The data architecture 100 associates FDM volumes 120 to physical flash memory blocks 102 of one or more flash memory devices. Generally, the FDM volumes 120 can be variable in size, and may be modified by a user subsequent to compilation of the user's application. As a result, the boundaries of an FDM volume 120 can be adjusted during run time of an application. The FDM volumes 120 can also span multiple flash memory blocks 102 and have boundaries that do not need to correspond to flash memory block boundaries. However, in this case, additional overhead is required to process partial flash memory blocks during erasing and writing operations. A more detailed description of the FDM volumes 120 and object management thereof is provided in commonly assigned, co-pending U.S. application Ser. Nos. 10/232,952, entitled DYNAMIC VOLUME MANAGEMENT, to Wong, filed Aug. 29, 2002, and 10/233,324, entitled LINEAR AND NON-LINEAR OBJECT MANAGEMENT, to Wong, filed Aug. 29, 2002, which are incorporated herein by reference.

Each of the FDM volumes 120 can include linear objects 150 and container objects 200. A linear object 150 is generally used to store data in linear or consecutively addressed fashion, such as application code which is desirable to store in consecutive memory addresses to allow the code to be executed directly from flash memory. In contrast, non-linear objects generally store data that can be stored in non-contiguous segments of memory. In embodiments of the present invention, partitioning the memory space of a flash memory into two regions, one for linear data and the other for non-linear data, is not necessary. Consequently, linear objects 150 and non-linear objects, in the form of containers 200, can be stored anywhere within the available memory space of flash memory. Embodiments of the present invention allow for more flexible use of the available memory space of flash memory, thus, providing the ability for efficient linear and non-linear data storage. The memory space of flash memory can be utilized in an open manner, storing data objects in the available memory space independent of the particular type of data, rather than accommodating a fixed partitioned memory space where the location at which data is stored in memory is governed by the particular data type (i.e., either linear or non-linear).

Figure 2:
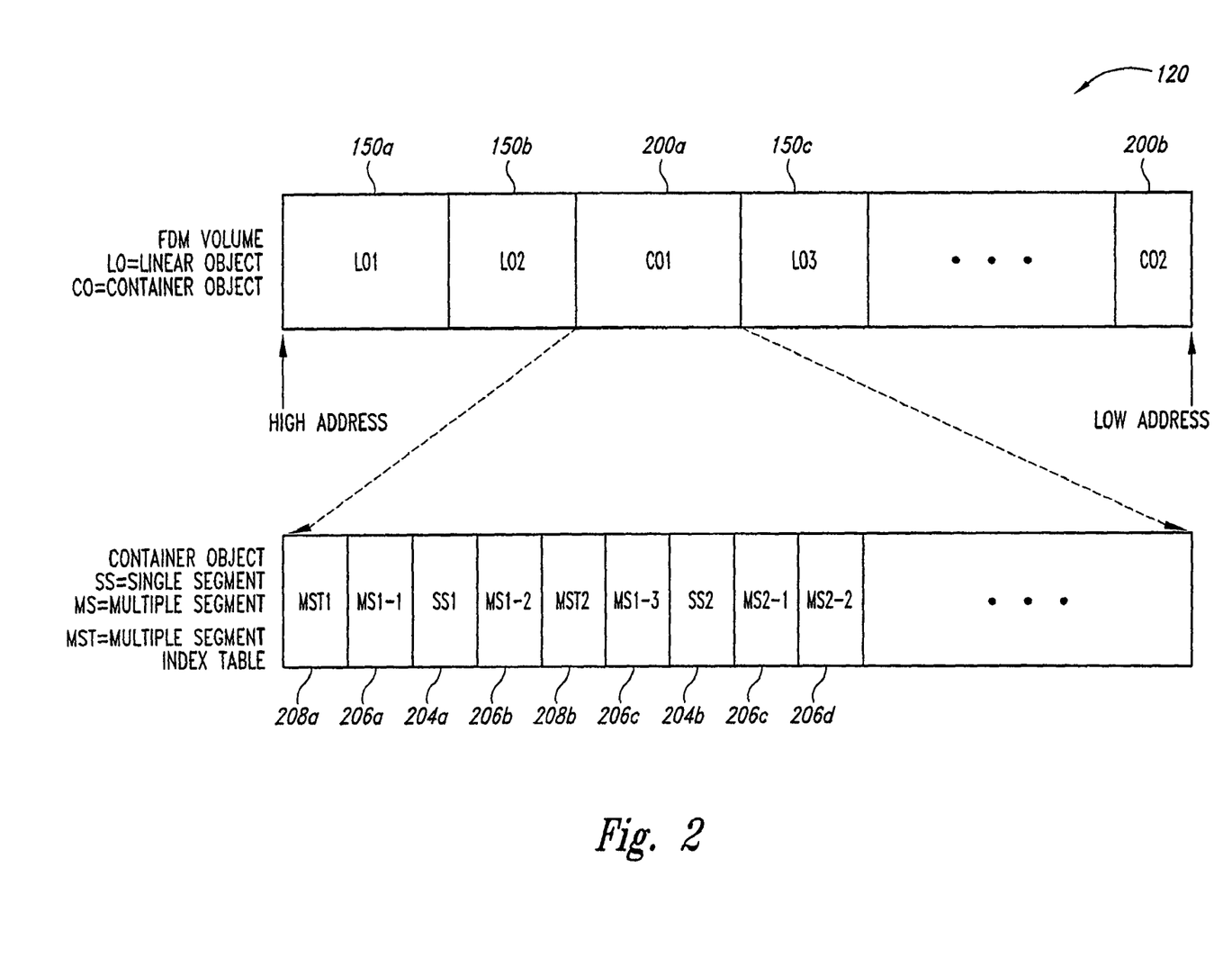
FIG. 2 is a drawing of a container object according to an embodiment of the present invention.

FIG. 2 illustrates the container object 200 according to an embodiment of the present invention. The container object 200 is used to store non-linear data in a "linear" fashion, thereby enabling linear and non-linear data to be inter-mixed throughout the available memory space of the flash memory device. The container object 200 includes non-linear objects in the form of single segment (SS) data objects 204 and multiple segment (MS) data objects 206. Generally, MS data objects 206 represent multiple segments of data objects that are associated with one another to form a relatively large data object in the form of a non-linear object. A MS data object table 208 is maintained to record the association of the multiple data segments. Examples of the types of data represented by MS data objects 206 are computer graphic images, voice data files, downloaded email messages, and the like. Management of MS data objects 206 are discussed in greater detail in commonly assigned, co-pending U.S. application Ser. No. 10/232,822, entitled MULTIPLE SEGMENT DATA OBJECT MANAGEMENT, to Wong et al., filed Aug. 29, 2002, which is incorporated herein by reference.

SS data objects 204, on the other hand, are relatively small and have data self-contained in a single segment of the memory space. In embodiments of the present invention, the SS data objects 204 can be used to store data having a length less than one read/write unit. A read/write unit is typically the minimum byte size that can be stored in memory and perform flash device input/output operations. The read/write unit is defined by the user at compile time and can be used as a default size for the SS data objects 204 where a developer does not specifically define the length of the SS data object 204. However, the SS data object 204 is not restricted to a single read/write unit, and can be of lesser or greater length when desirable. For example, where it is anticipated that the data will be updated often, the developer can define the SS data object 204 to be greater than one read/write unit.

Additionally, the SS data object 204 provides for data instances to be updated "in place" by writing new data instances in the data area and changing the object state of the former data instance to indicate that it has been updated. This avoids the need to define a new data object when updating data with new information. Additionally, the SS data objects 204 allow for variable length updating, that is, updated existing data having a different length than the previous data instances can be written to available memory within the memory space allocated for an SS data object 204. An example of the type of data represented by an SS data object 204 is phone numbers of a user phone book.

Figure 3:
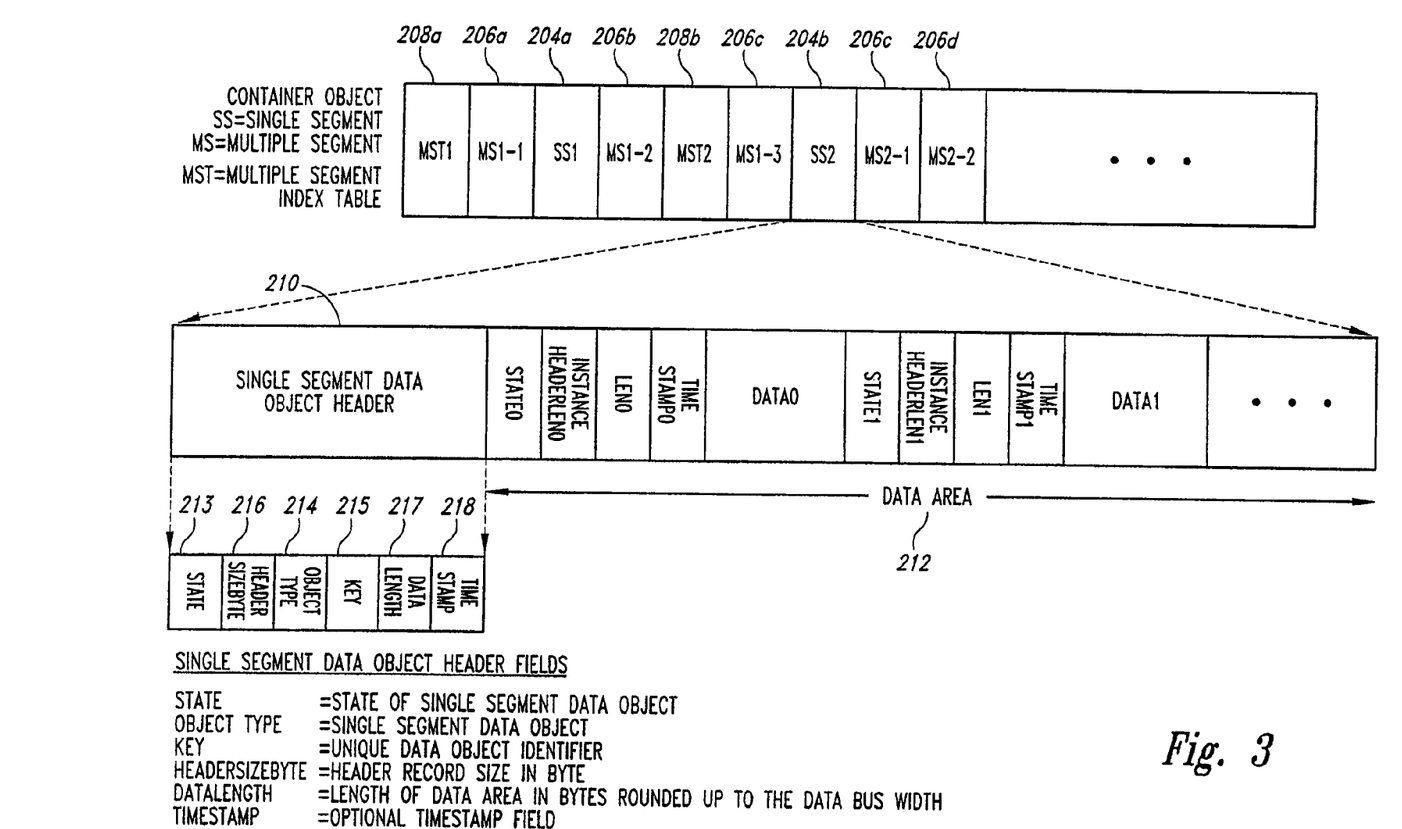
FIG. 3 is a drawing of a single segment data object of the container object of FIG. 2 in accordance with an embodiment of the present invention.

As shown in FIG. 3, the SS data object 204 according to an embodiment of the present invention includes an SS data object header 210 and an SS data object data area 212. The SS data object header 210 contains various fields, such as, State=state of the SS data object;
ObjectType=single segment data;
Key=unique data object identifier;
HeaderSizeByte=header record size in bytes;
DataLength=length of the Data Area in bytes rounded up to the next flash access byte; and
TimeStamp=optional timestamp field.

Figure 5:
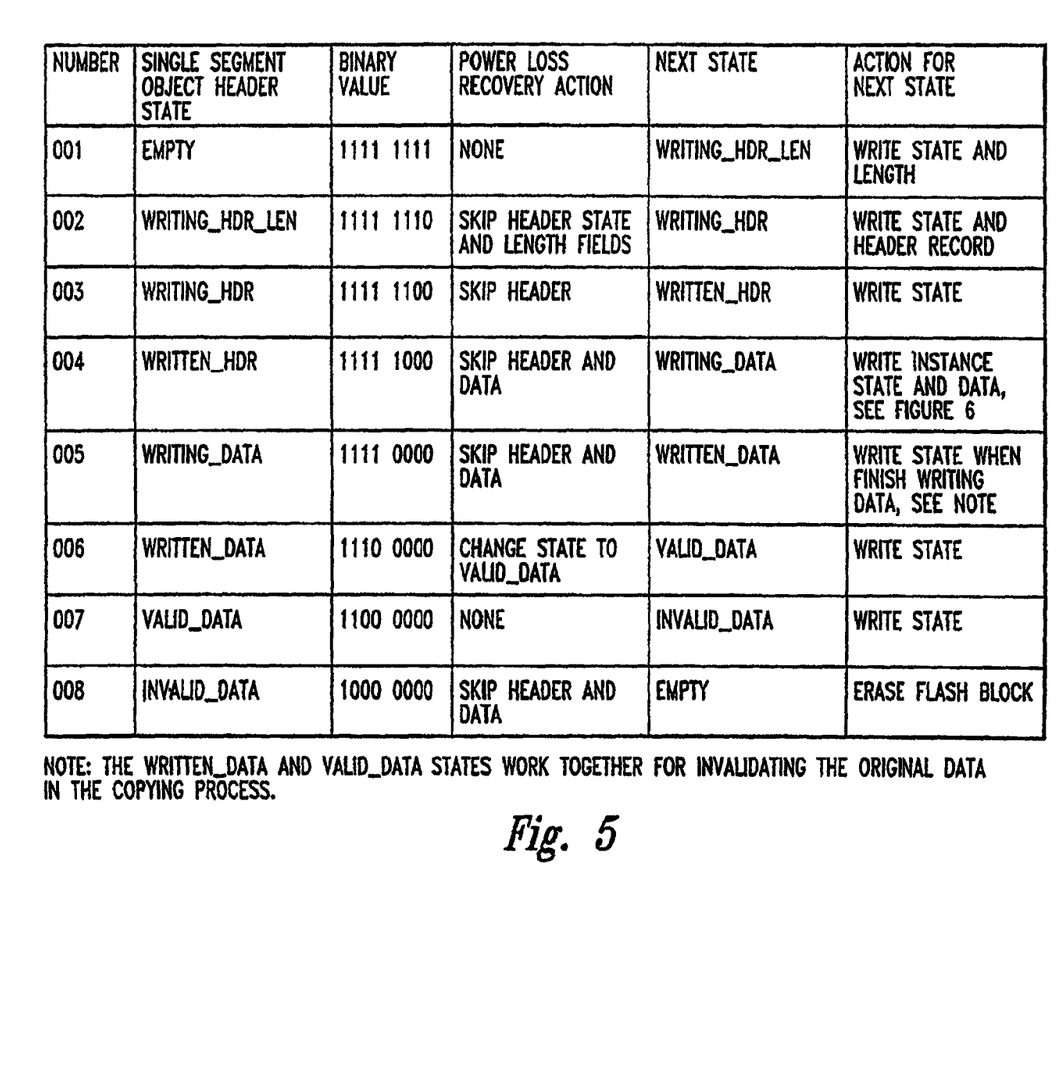
FIG. 5 is a table showing object states for a single segment data object according to an embodiment of the present invention.

With respect to the State field 213, FIG. 5 shows a table of object states of the SS data object header 210 according to an embodiment of the present invention. In summary, the "EMPTY" state indicates free erased memory space available for writing. The "WRITING_HDR_LEN" state indicates that a header length is being written. The "WRITING_HDR" state indicates that the data object header is in the process of being written, such as writing the object state, but there is currently no data stored. The "WRITTEN_HDR" state indicates that the header is complete. The "WRITING_DATA" state indicates that data is being written and the data size is known. The "WRITTEN_DATA" state indicates that data has been written but not yet marked as valid. The WRITTEN_DATA state distinguishes between a copy of an object and the original object during the data copying process, in the event power loss occurs during a reclamation process or an update process. The WRITTEN_DATA state also distinguishes the completed state of the object during the creation of the object for the first time in the event of power loss recovery. The VALID_DATA state indicates that the stored data is valid. The INVALID_DATA state indicates that the data is freed and is eligible for reclamation. As will be explained in more detail below, the granularity of the object states facilitates a power loss recovery process that can be used to recover data in the event of power loss and ensure valid data.

As shown in FIG. 5, the object state of the SS data object 204 can be represented by a binary value. Each state change clears a single bit of the binary value. As the object state of the SS data object 204 changes over time, the FDM updates the state field to reflect data transitions from one object state to another by programming the value corresponding to the new object state. As the state of the SS data object 204 transitions, for example, from an EMPTY state to a WRITING_HDR_LEN state, and where the least significant bit (LSB) corresponds to the WRITING_HDR_LEN state, the data of the State field 213 will change from 1111 1111 to 1111 1110. As known by those of ordinary skill in the art, in the case of NOR flash memory devices, an uprogrammed (i.e., erased) memory cell of flash memory is represented by a value of "1" and a programmed memory cell is represented by a value of "0" (in contrast to NAND flash memory devices where the process is inverted). Consequently, in updating the object state from EMPTY to WRITING_HDR_LEN, the value 1111 1110 can be written directly to the state field without the need for erasing any cells because only the LSB needs to be programmed to indicate a change in object state. The other bits remain unprogrammed. As the object state transitions, each succeeding bit gets programmed to reflect the change in object states. For example, if the second to the LSB corresponds to a WRITING_HDR state, then the data of the State field 213 is modified from 1111 1110 to 1111 1100 when the state of the SS data object 204 transitions from the WRITING_HDR_LEN state after the header record and state have been written. It will be appreciated that the previous example was provided for the purpose of illustration, and the correspondence of bits to states can be modified without departing from the scope of the present invention. Consequently, the foregoing example is not intended to limit the scope of the present invention to any particular embodiment.

The SS data object header 210 can also include an ObjectType field 214 that contains data representing the SS data object 204 and a Key field that contains data representing a unique identifier of the SS data object 204. Additionally, a HeaderSizeByte field 216 and a DataLength field 217 can be included in the SS data object header 210. An optional TimeStamp field 218 containing data representing the time at which the SS data object 204 was written can also be included in the SS data object header 210 when desired. The HeaderSizeByte 216 field contains data indicative of the length of the SS data object header 210, thus, allowing optional fields to be present in the SS data object header 210 for some SS data objects 204 and not others. For example, where it is desirable for the optional TimeStamp field 218 to be included in the header of a SS data object 204, the value of the HeaderSizeByte field 216 can be specified to accommodate the length due to the additional TimeStamp field 218. Other SS data objects 204 not having the optional TimeStamp field 218 will have a shorter SS data object header 210. The DataLength field 217 can also be included in the SS data object header 210, allowing the data object data area 212 of each SS data object 204 to be variable in length and defined by a developer. It will be appreciated by those of ordinary skill in the art that the particular fields described above are exemplary, and that modification to the types of fields included in the SS data object header 210 can be modified without departing from the scope of the present invention.

Figure 4:
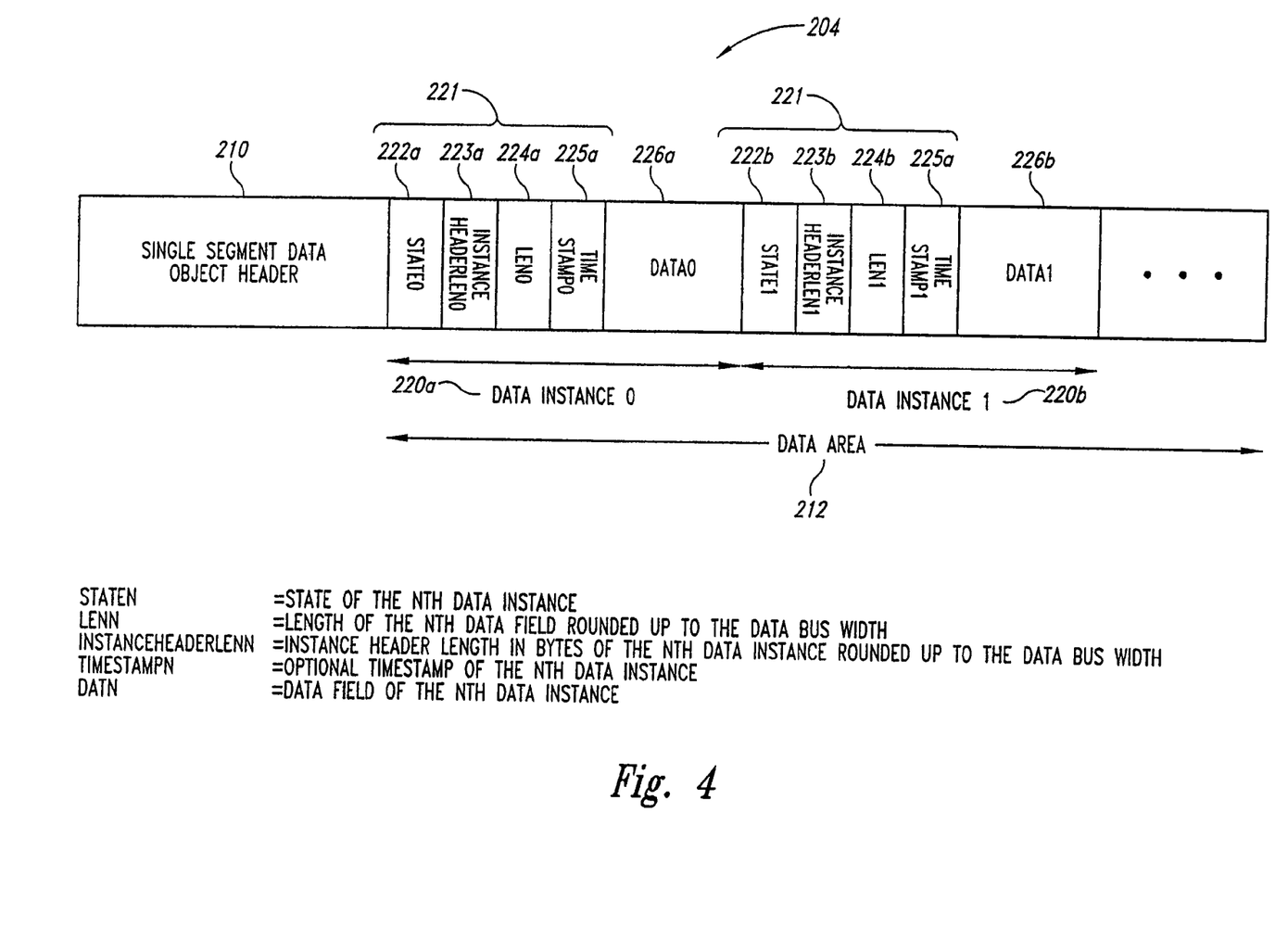
FIG. 4 is a drawing of data instances of the single segment data object of FIG. 3 in accordance with an embodiment of the present invention.

The data area 212 of the SS data object 204 contains a data instance or instances 220. Each data instance 220 includes a data instance header 221 and a DataN field 226 that contains the data of the data instance 220. Contained in the data instance header 221 are various fields, such as, StateN=State of the Nth data instance;
LenN=Length of the Nth data field in bytes;
InstanceHeaderLenN=Instance header length of the Nth data instance; and
TimeStampN=Optional time stamp at which the Nth data instance is written.

Figure 6:
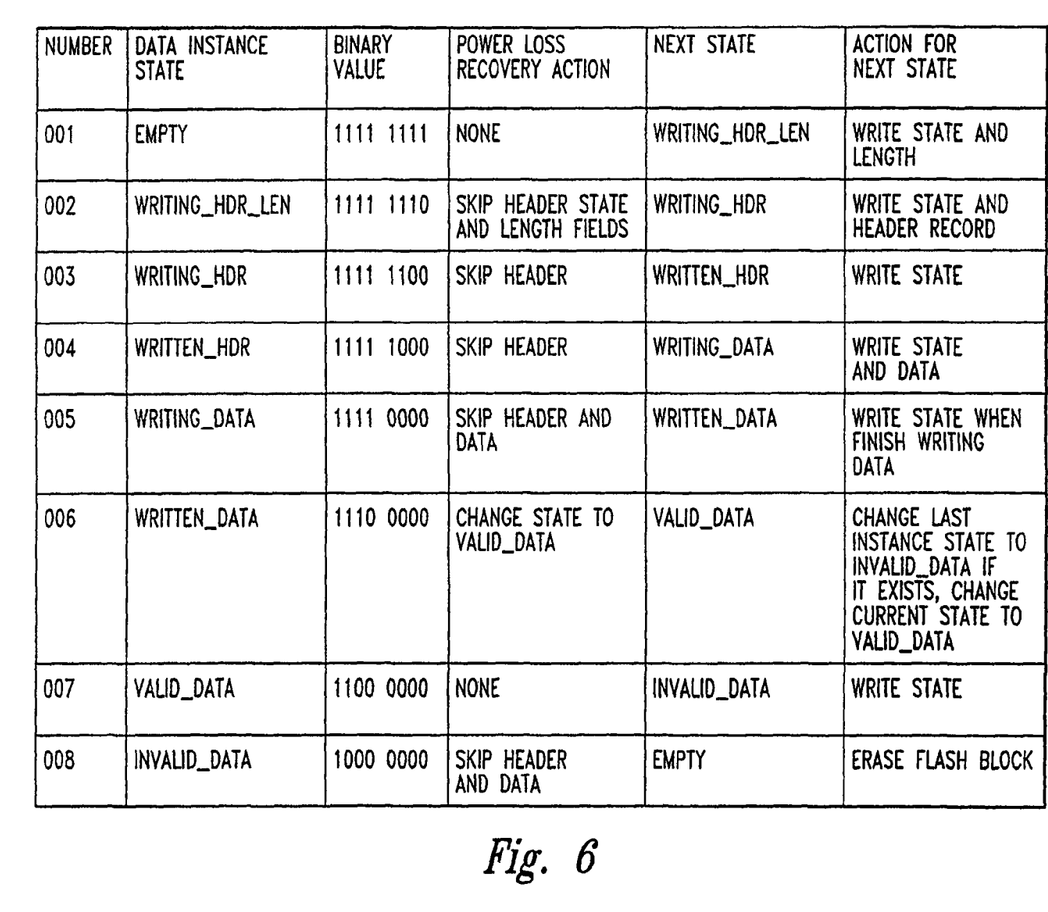
FIG. 6 is a table showing object states for a data instance according to an embodiment of the present invention.

The information of a StateN field 222 can use essentially the same state codes as described above with respect to the SS data object header 210. FIG. 6 shows a table of object states for the data instance 220 according to an embodiment of the present invention. The particular states have been described above generally, and will not be further discussed in detail herein in the interest of brevity. It will be appreciated by one of ordinary skill in the art, however, that the specific definition of the object states of FIG. 6 may be different than those shown in the table of FIG. 5 taken in the context of the data instance 220. By including the StateN field 222 with each data instance 220, data can be updated by appending a new instance of data to the instance of data being superceded if there is sufficient memory space in the data area 212 of the SS data object 204 (as defined by the DataLength field of the SS data object header 210). The respective object state codes will be used to differentiate the new and superceded data instances, with the new instance of data having object state indicating a VALID_DATA state, and the object state of the existing instance of data modified (i.e., programmed) to indicate an INVALID_DATA state. The object state for the SS data object header 210 will remain unchanged during the update since the data of the SS data object 204 is still valid following the update.

A LenN field 224 describes the length of the data field for the particular instance of data. Contrast this with the DataLength field of the SS data object header 210, which defines the length of the data area 212 such that memory space can be reserved for appending new data for data updating purposes. Optional InstanceHeaderLenN field 223 and TimeStampN field 225 can be included in the data instance header to vary the length of the data instance header and include data representing the time at which the data instance was written to memory. The DataN field 226 represents the data of the data instance 220, and, as previously discussed, is stored in a data field having a length defined by the LenN field 224. The LenN field 224 allows for subsequent data instances (i.e., updated data) written to the SS data object 204 to be longer or shorter than previously written data instances, that is, variable length, in place updating. Thus, the data instances 220 of the SS data object 204 are not limited to a common length defined in the SS data object header 210, but the length of each data instance 220 can be tailored through the use of the LenN field 224.

Various processes of the FDM use the information in the SS data object header 210 and the data instance header 221 are used by various processes of the FDM in managing the data objects. As previously mentioned, a power loss recovery process uses the state information for data recovery in the event of a power failure. When a power loss recovery process is performed, the saved data can be restored by examining the state field. As shown in FIGS. 5 and 6, a power loss recovery process can make the determination on how to take action based on the object state of the SS data object 204 and the data instance 220. For example, assuming that the object states shown in FIGS. 5 and 6, when the data object has an EMPTY state will no action be taken during the power loss recovery process. When the data object has a VALID_DATA state, the power loss recovery process determines whether any other copies of the data object exist and which copy should be recovered. For other object states, it is assumed that parts of the data object are unreliable or in an incomplete state, the data state is changed to an INVALID_DATA state, and are ignored by skipping past the appropriate portions of memory. The power loss recovery process will transition the information in the state field of the new data objects having a WRITTEN_DATA state to a VALID_DATA state, and any corresponding copies of the data objects having a VALID_DATA state to an INVALID_DATA state. In this manner, uncorrupted data can be guaranteed in the event a write operation is interrupted by power loss. Thus, in the worst case, a power failure during the updating of a data object results in the loss of the new data. The old data remains valid and can be recovered.

A reclamation process also uses the information of the state field to determine when a block of memory can be erased to reclaim memory, namely, when the state of the SS data object 204 is in the WRITING_HDR_LEN, WRITING_HDR, WRITTEN_HDR, WRITING_DATA, and INVALID_DATA states. That is, during reclamation of a container object, only SS data objects having a VALID_DATA state are copied into the new container object. In the event of power loss, either the new or old container object will be recovered. Consequently, only the valid SS data objects or the original SS data objects will be recovered. A more detailed description of a reclamation process using the information of the state field is provided in commonly assigned, co-pending U.S. application Ser. No. 10/232,955, entitled LINEAR OBJECT MANAGEMENT FOR A RANGE OF FLASH MEMORY, to Wong et al., filed Aug. 29, 2002, which is incorporated herein by reference.

Figure 7:
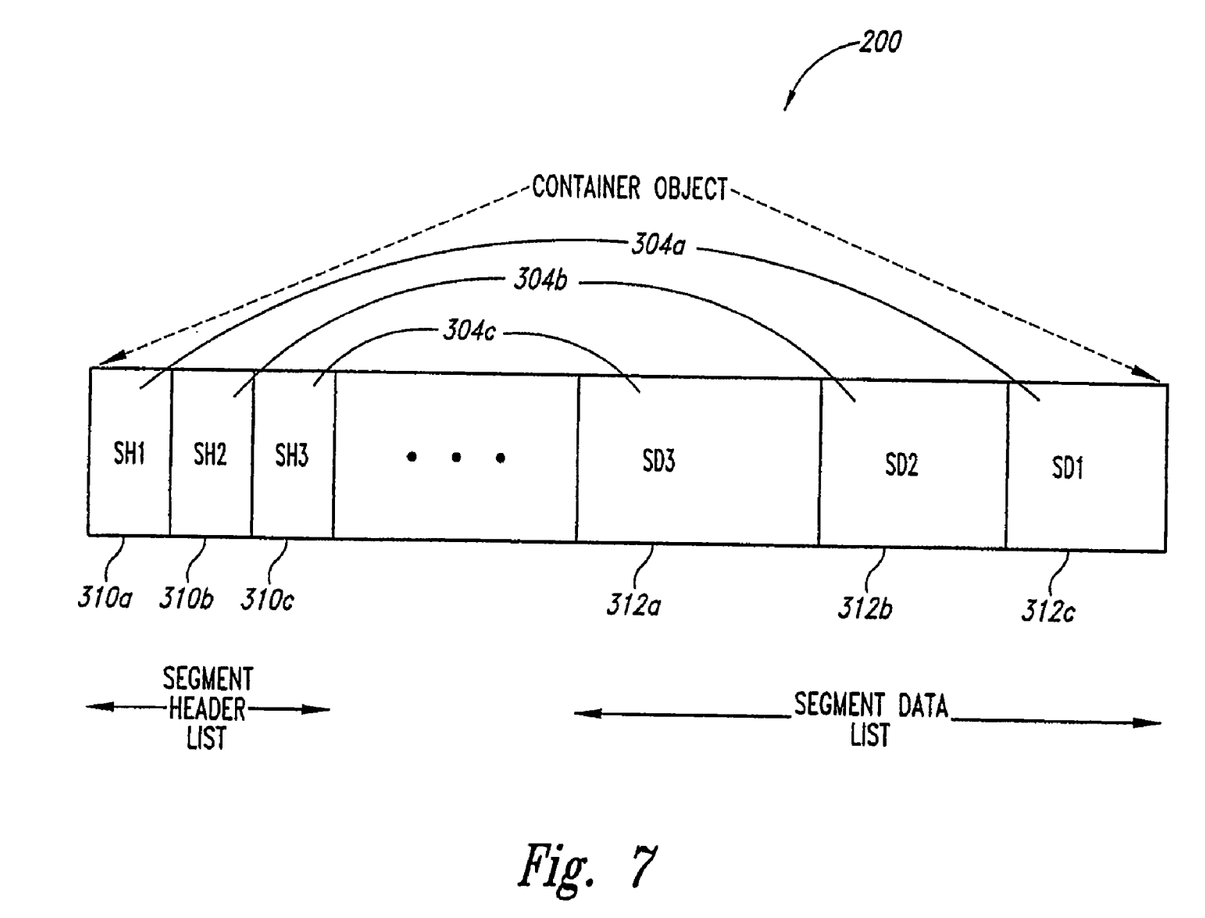
FIG. 7 is a drawing of a single segment data object in the container object of FIG. 2 in accordance with an alternative embodiment of the present invention.

Although the SS data object 204 has been illustrated in FIG. 3 as having the SS data object header 210 and the data area 212 are stored contiguously. However, it will be appreciated by those of ordinary skill in the art that the SS data object header 210 and the data area 212 can be stored in separate locations of the memory without departing from the scope of the present invention. For example, as shown in FIG. 7, for a SS data object 304, a SS data object header 310 can be stored in a first location, such as a segment header list, and a data area 312 stored in a second, non-adjacent location in the memory, such as a data list. The SS data object headers 310 would include addressing information to locate the respective data areas 312. The segment header list can start at the beginning of the container object 200 (FIG. 2) and the data list start at the end of the container object 200 and extend toward the beginning. Therefore, the particular arrangement of the data area with respect to the SS data object header for a SS data object should not limit the scope of the present invention.

From the foregoing it will be appreciated that, although specific embodiments of the invention have been described herein for purposes of illustration, various modifications may be made without deviating from the spirit and scope of the invention. For example, the SS data object 204 has been described as being included in a container object 200, which itself may be included in a FDM volume 120. Both the container object 200 and the FDM volume 120 have been described as being variable in length, and can be stored anywhere within the available memory space. However, it will be appreciated that the SS data object 204 can also be employed with other data constructs not specifically described herein without departing from the scope of the present invention. Accordingly, the invention is not limited except as by the appended claims.

The invention claimed is:

1. A method for recovering from a power loss in a memory, the method comprising:
   accessing a state field in a data structure encoded on the memory, the data structure including a single segment data object having a header record and a data record, the data record containing at least one data instance object, the data instance object including a header field and a respective data field, the header field having a segment length field and the state field, wherein the segment length field at least partially defines a region of the memory device reserved for the data of the respective data field and the state field includes data representing a state of the data of the respective data field;
   when the state field indicates the data instance object was valid prior to the power loss, recovering either the data instance object or another copy of the data instance object; and
   when the state field indicates that data for the data instance object was written but not yet valid prior to the power loss, updating the state field to indicate valid data.

2. The method according to claim 1, wherein the state field is configured to indicate a first state when the data instance object is valid, a second state when the data instance object has been written but not yet indicated as valid, and a third state when the data instance object is invalid.

3. The method according to claim 2, wherein the state field is further configured to indicate a fourth state when the data instance object is being written.

4. The method according to claim 3, further comprising when the state field indicates the data instance object was being written prior to the power loss, updating the state field to indicate invalid data.

5. The method according to claim 1, further comprising when the state field indicates the object state of the data instance object was written but not yet valid prior to the power loss, locating additional copies of the data instance object and updating the respective state fields of the additional copies to indicate invalid data.

6. The method according to claim 1, wherein the data field is configured to encode a single segment data object in a single segment of the memory device.

7. The method according to claim 6, wherein the single segment data object is configured to have a length equal to or less than a read/write unit of the memory device.

8. The method according to claim 1, wherein the header field further includes a time stamp field containing data representing time information at which the data instance was written.

9. The method according to claim 1, wherein the data structure further includes a plurality of data instance objects, each of the data instance objects having a respective header field and respective data field, and wherein only one of the plurality of data instance objects includes a state field reflecting a valid data state.

10. The method according to claim 1, wherein the data structure further includes at least one multi-segment data object configured to store at least a portion of a non-linear data object, and wherein the single segment data object is configured to store a linear data object.

11. A memory comprising:
    non-volatile memory; and
    a data manager configured to execute a power loss recovery process comprising:
      accessing a state field in a data structure encoded on the non-volatile memory, the data structure including a single segment data object having a header record and a data record, the data record containing at least one data instance object, the data instance object including a header field and a respective data field, the header field having a segment length field and the state field, wherein the segment length field at least partially defines a region of the non-volatile memory device reserved for the data of the respective data field and the state field includes data representing a state of the data of the respective data field;
      when the state field indicates the data instance object was valid prior to the power loss, recovering either the data instance object or another copy of the data instance object; and
      when the state field indicates that data for the data instance object was written but not yet valid prior to the power loss, updating the state field to indicate valid data.

12. The memory according to claim 11, wherein the state field is configured to indicate a first state when the data instance object is valid, a second state when the data instance object has been written but not yet indicated as valid, and a third state when the data instance object is invalid.

13. The memory according to claim 12, wherein the state field is further configured to indicate a fourth state when the data instance object is being written.

14. The memory according to claim 13, wherein the power loss recovery process further comprises, when the state field indicates the data instance object was being written prior to the power loss, updating the state field to indicate invalid data.

15. The memory according to claim 11, wherein the power loss recovery process further comprises, when the state field indicates the object state of the data instance object was written but not yet valid prior to the power loss, locating additional copies of the data instance object and updating the respective state fields of the additional copies to indicate invalid data.

16. The memory according to claim 11, wherein the data field is configured to encode a single segment data object in a single segment of the non-volatile memory.

17. The memory according to claim 16, wherein the single segment data object is configured to have a length equal to or less than a read/write unit of the non-volatile memory.

18. The memory according to claim 11, wherein the header field further includes a time stamp field containing data representing time information at which the data instance was written.

19. The memory according to claim 11, wherein the data structure further includes a plurality of data instance objects, each of the data instance objects having a respective header field and respective data field, and wherein only one of the plurality of data instance objects includes a state field reflecting a valid data state.

20. The memory according to claim 11, wherein the data structure further includes at least one multi-segment data object configured to store at least a portion of a non-linear data object, and wherein the single segment data object is configured to store a linear data object.

21. The memory according to claim 11, wherein the data manager is further configured to perform a reclamation process including erasing a block of the non-volatile memory, based at least in part, on data in the state field of the data instance object.

22. The memory system according to claim 21, wherein the reclamation process includes erasing the block of the non-volatile memory when the data in the state field corresponds to an invalid data state.

* * * * *

UNITED STATES PATENT AND TRADEMARK OFFICE
CERTIFICATE OF CORRECTION

PATENT NO. : 8,364,887 B2
APPLICATION NO. : 12/694959
DATED : January 29, 2013
INVENTOR(S) : Wanmo Wong et al.

It is certified that error appears in the above-identified patent and that said Letters Patent is hereby corrected as shown below:

In the Claims:

In column 12, line 4, in Claim 22, after "memory" delete "system".

Signed and Sealed this
Seventh Day of May, 2013

Teresa Stanek Rea
*Acting Director of the United States Patent and Trademark Office*